United States Patent [19]
Pinson

[11] Patent Number: 5,720,789
[45] Date of Patent: Feb. 24, 1998

[54] METHOD FOR CONTAMINATION CONTROL AND BARRIER APPARATUS WITH FILTER FOR CONTAINING WASTE MATERIALS THAT INCLUDE DANGEROUS PARTICULATE MATTER

[75] Inventor: Paul A. Pinson, Idaho Falls, Id.

[73] Assignee: Lockheed Idaho Technologies Company, Idaho Falls, Id.

[21] Appl. No.: 632,034

[22] Filed: Apr. 12, 1996

Related U.S. Application Data

[63] Continuation of Ser. No. 303,258, Sep. 6, 1994, abandoned.
[51] Int. Cl.$^6$ .................................................. B01D 46/00
[52] U.S. Cl. ........................... 55/364; 55/376; 55/385.4; 55/486; 55/502; 55/505
[58] Field of Search .......................... 55/364, 372, 376, 55/382, 502, 505, 385.2, 385.4, 486, 490

[56] References Cited

U.S. PATENT DOCUMENTS

| | | | |
|---|---|---|---|
| 1,828,584 | 10/1931 | Andersen | 55/364 |
| 1,977,139 | 10/1934 | O'Brien | 55/364 |
| 2,065,775 | 12/1936 | Wahlert | 55/382 |
| 3,961,921 | 6/1976 | Heiman et al. | 55/364 |
| 4,116,648 | 9/1978 | Busch | 55/382 |
| 4,449,970 | 5/1984 | Bevan et al. | 55/385.4 |
| 4,589,894 | 5/1986 | Gin et al. | 55/376 |
| 4,807,619 | 2/1989 | Dyrud et al. | |
| 4,886,058 | 12/1989 | Brostrom et al. | |
| 4,921,645 | 5/1990 | Insley | |
| 4,957,518 | 9/1990 | Brassell | |
| 5,017,197 | 5/1991 | McGuire et al. | 55/385.2 |
| 5,035,240 | 7/1991 | Braun et al. | |
| 5,244,703 | 9/1993 | Bosses | 55/382 |

OTHER PUBLICATIONS

Various brochures from 3M Company, Nov. 1991.

*Primary Examiner*—C. Scott Bushey
*Attorney, Agent, or Firm*—Thorpe North & Western

[57] ABSTRACT

A container for hazardous waste materials that includes air or other gas carrying dangerous particulate matter has incorporated in barrier material, preferably in the form of a flexible sheet, one or more filters for the dangerous particulate matter sealably attached to such barrier material. The filter is preferably a HEPA type filter and is preferably chemically bonded to the barrier materials. The filter or filters are preferably flexibly bonded to the barrier material marginally and peripherally of the filter or marginally and peripherally of air or other gas outlet openings in the barrier material, which may be a plastic bag. The filter may be provided with a backing panel of barrier material having an opening or openings for the passage of air or other gas into the filter or filters. Such backing panel is bonded marginally and peripherally thereof to the barrier material or to both it and the filter or filters. A coupling or couplings for deflating and inflating the container may be incorporated. Confining a hazardous waste material in such a container, rapidly deflating the container and disposing of the container, constitutes one aspect of the method of the invention. The chemical bonding procedure for producing the container constitutes another aspect of the method of the invention.

27 Claims, 3 Drawing Sheets

METHOD FOR CONTAMINATION CONTROL AND BARRIER APPARATUS WITH FILTER FOR CONTAINING WASTE MATERIALS THAT INCLUDE DANGEROUS PARTICULATE MATTER

CROSS-REFERENCE TO RELATED APPLICATIONS

This is a continuation of application Ser. No. 08/303,258, filed Sep. 6, 1994, now abandoned.

CONTRACTUAL ORIGIN OF THE INVENTION

The United States Government has rights in this invention pursuant to Contract No. DE-AC07-76ID01570 between the United States Department of Energy and EG & G Idaho, Inc.

BACKGROUND OF THE INVENTION

1. Field

The invention has to do with hazardous waste containment control barriers, such as plastic bags or other barrier structures equipped with one or more filters, preferably of HEPA type, permitting passage of air or other carrier gas containing dangerous particulate matter but retaining such particulate matter. It has to do also with methods of producing such barriers and with use of the resulting barriers.

2. State of the Art

There has been much activity in areas involving the filtration of air or other gas containing dangerous particulate matter, particularly since the advent of nuclear technology and, more recently, the concern about asbestos contamination. Many U.S. patents having to do with containment of waste materials and with so-called HEPA (high efficiency particulate air) filters, have been issued. Dangerous particulate matter in hazardous waste materials is removed by such filters as incorporated in the barrier material.

A known and widely used way of attaching a certain type of HEPA filter produced and sold by NFT Incorporated, Lakeview, Colo., under the trademark NUCFIL® (also known as "Snap Filters") to flexible plastic barriers, such as flexible plastic bags, involves the use of rigid housings made up of separate components that are mechanically fastened together and to the barrier material marginally and peripherally of respective holes cut in such barrier material to receive such filters, see Gilbert H. Brassell U.S. Pat. No. 4,957,518 of Sep. 18, 1990. Air and other carrier gas pass through such rigidly housed filters very slowly and the rigidity of such housings makes handling of the barrier structure difficult. Moreover, the mechanical attachment is unreliable. A high potential exists for filter tear-out, which destroys containment of the dangerous particulate matter. It has been determined that air or other carrier gas flows through such filters at only about 0.2 liters of air per minute at one inch $H_2O$ DP, which flow rate is so low that it usually takes twenty minutes to deflate a large storage bag customarily used in the handling of nuclear contaminated waste as removed from fifty-five gallon steel drums for testing. Additionally the rigidly housed filters are relatively expensive to produce. This is particularly true if larger filters are utilized as contemplated by this invention.

Another known type of HEPA filter is incorporated in respiratory face masks to rid air, being breathed by the wearers of such face masks, of harmful particulate matter, see U.S. Pat. Nos. 4,807,619; 4,827,924; 4,883,547; 4,886,058; 5,062,421; and 5,230,800. Such masks and the filters incorporated therein are made and sold commercially by the Occupational Health and Environmental Safety Division of 3M Corporation, as its 3M 2000 line of HEPA filters under the teachings of its above-noted U.S. Pat. No. 4,886,058, the disclosure of which patent is incorporated herein by reference. While bonding of various plastic sheet materials together by heat sealing techniques and by adhesives is well known in the art and used in certain respects in the production of the afore-referred to filters for respiratory face masks, such bonding has never been suggested as a substitute for the mechanical attachment of filter to a barrier system, presumably because it was not regarded as an effective way of attaching filter to a barrier.

SUMMARY OF THE INVENTION

HEPA filters are defined as those having the capacity to filter 0.3 micron particles of dioctylphalate with 99.97% efficiency. These and similar filters, not strictly within the purview of this definition are included in the term "HEPA Type" filters as used herein. "HEPA type" filters as used in this invention are those that are capable of filtering out the dangerous particulate matter in question as well as having sufficient gas permeability to allow rapid deflation of the barrier system, and preferably in a time period of less than about 10 minutes and more preferably in less than about one minute. The cross sectional area of the filter material or the inherent permeability of the material may be adjusted to achieve the desired results.

Heretofore, there has been no lightweight, simple, and fool-proof way of deflating sealed plastic bags to rapidly reduce or eliminate, trapped air volume or the volume of gas generated by confined hazardous material. The mechanical attachment of the so-called "Snap On" rigidly housed filters leaves much to be desired, particularly in the tendency toward ineffective sealing and of being dislodged by less than gentle handling, as well as the relative costliness of such filters.

In the making of the present invention, it was a principal object to provide barrier structures, such as plastic bags and plastic sheet barrier panels for incorporation in hazardous waste material control areas, that would overcome the difficulties encountered in this industrial art in which ease of handling the hazardous waste material and absolute safety is so important.

In accomplishing this objective, I have found that the HEPA type filters heretofore applied only to respiratory face masks, or components of such filters, can be effectively attached to plastic sheet barrier material by known bonding means and techniques, particularly heat seal welding, as by thermal impulse or ultrasonic bonding, so the so-attached filters become, in effect, an integral part of such barrier material and effectively and safely provide control of dangerous particulate matter. Moreover, couplings for gas evacuation or introduction can be effectively and safely incorporated if so desired.

I have found that integral filter fabrication can be done during manufacture of the waste-containment bag or barrier panel or thereafter to provide substantially total flexibility for the waste-confining or other barrier panel, thereby overcoming difficulties encountered with mechanical attachment. I have found that HEPA type filters attached in accordance with the invention not only provides for rapid passage of large quantities of air (or of other gases) as they do in respiratory face masks, while retaining dangerous particulate matter such as radioactive or asbestos particles, but also provides the required substantially absolute safety against contamination. The resulting barrier structure reduces the volume of contained material, for example bagged waste, thereby simplifying disposal, and makes handling easier because the filter and its bonded attachment to the barrier material are both flexible, so that the desirable characteristics of a flexible plastic bag or other flexible containment barrier are retained throughout.

The invention herein completely eliminates the need for a housing to clamp onto the barrier, thus significantly reducing the cost of the final filter containing barrier system. This provides the additional advantage in enabling the cross sectional or shape of the filter material to be increased and adapted to the shape of the source of contaminated gas or air with relatively minor additional cost. This ability to readily increase the cross sectional area of the filter with minimal additional expense can be very important when plugging of the filter may be a problem. Plugging of the filter could result in reduced gas transmission and potential in rupture of the bag or other barrier system. This could be extremely dangerous when especially hazardous contaminants are involved such as asbestos fibers, pharmaceutical or medical waste, or alpha particle contaminated particulate matter.

Furthermore, it will be understood that in its preferred embodiment where a HEPA type filter is incorporated in a barrier system that significant advantages are obtained such as the ability to rapidly deflate the barrier system, irregardless of how the HEPA filter is attached to the barrier system. Thus even the prior art methods of attachment using rigid housings and clamp-on means would be applicable to this aspect of this invention.

Thus this invention relates to a contamination control barrier for hazardous waste materials that include dangerous particulate matter suspended in a carrier gas, comprising a barrier material having an opening therethrough for the passage of said carrier gas; covering the opening is a HEPA type filter and wherein the filter is sealably attached to the barrier material such that the contamination control barrier prevents passage of the dangerous particulate matter through said control barrier while allowing rapid passage of said carrier gas through the control barrier.

Another embodiment of this invention relates to a contamination control barrier for hazardous waste materials that include dangerous particulate matter suspended in a carrier gas, comprising a sheet of barrier material having an opening therethrough for the passage of air or of other gas; covering the opening is a filter sealably attached to said barrier material and which filter prevents passage of said dangerous particulate matter while allowing passage of said carrier gas through said control barrier; and chemical bonding means attaching the respiratory face mask filter to the barrier material peripherally of the opening, so that the filter becomes in effect an integral part of the control barrier.

Preferably the barrier material and filter of this invention are made of flexible materials such as flexible, plastic panel or sheet type materials. The barrier system is preferably in the form of a plastic bag, similar to a conventional trash bag. In a preferred embodiment material of this invention, the barrier and filter comprise materials that do not form toxic fumes, such as chlorine gas which attack refractory materials, upon incineration. Thus, for example a plastic bag containing a filter according to this invention maybe filled with alpha particle contaminated particulate matter, the bag is then rapidly evacuated, transported to an incinerator, and the filter containing bag and its contents can then be incinerated without the release of toxic fumes.

In many applications not involving incineration polyvinyl chloride is a preferred material of the barrier system due to its strength, cost and other properties.

If only air entrained with confined waste is a problem, the filtered air outlet of the container will be sealed before disposal of the container to prevent re-inflation. If the waste is gas-generating, as are radioactive materials that generate hydrogen during electrolytic decomposition, the outlet is left unsealed for disposal of the container, thereby permitting exit of generated gas and eliminate the build-up of explosive gas mixtures.

BRIEF DESCRIPTION OF THE DRAWINGS

A bag/barrier system made of filter materials according to this invention can readily be incinerable. Such a bag would be a safe method of containing and destroying certain hazardous materials that can safely be destroyed by incineration. In this embodiment it would be desirable to have the barrier and filter materials made from materials that will not product toxic fumes during incineration.

Embodiments presently contemplated as the best mode of carrying out the invention in practice are shown in the accompanying drawing in which.

DETAILED DESCRIPTION OF THE INVENTION

Figure 1:
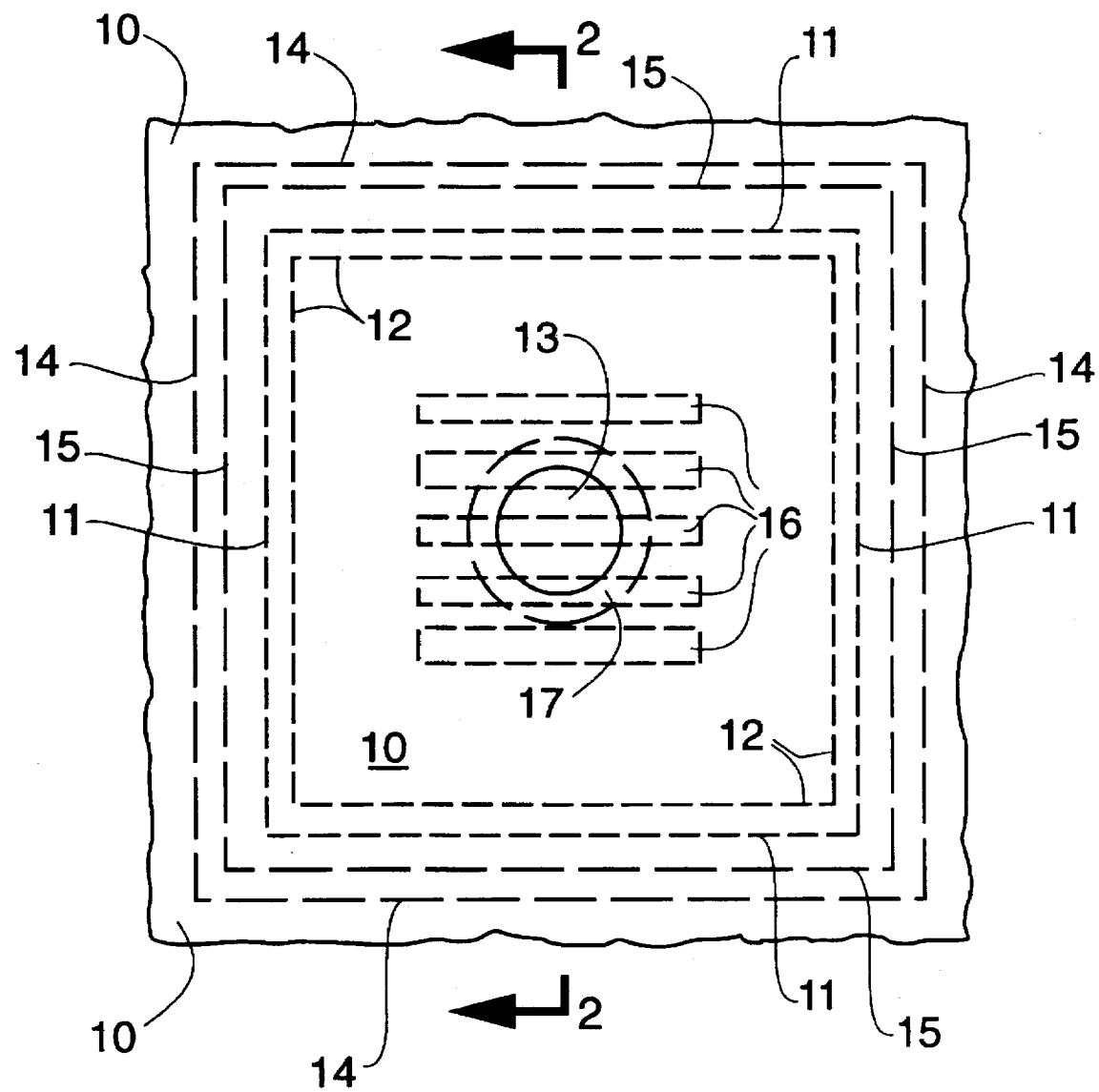
FIG. 1 is a fragmentary elevational view of the outside face of a flexible plastic sheet barrier panel, such as a broad side of a plastic bag, there being flexibly bonded therein in accordance with the invention a flexible HEPA type filter, hidden parts being indicated by broken lines.
Figure 2:
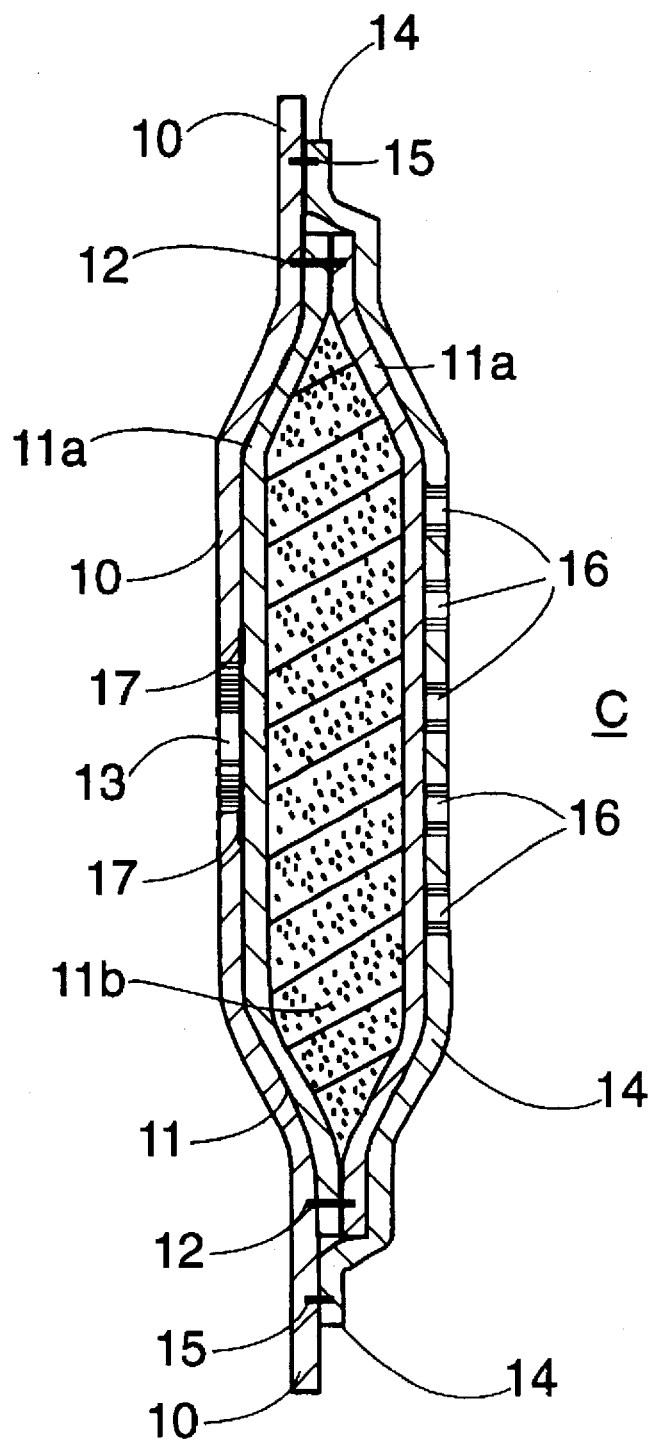
FIG. 2, a vertical section taken on the line 2—2 of FIG. 1 and drawn to a larger scale.

In the embodiment illustrated in FIGS. 1 and 2, a sheet plastic barrier panel 10 may be, but is not necessarily, part of a typical waste-material-containment plastic bag for hazardous waste. Instead of being provided with the usual, rigidly-housed and mechanically attached HEPA filter, such a bag is provided with a flexible HEPA type filter 11 chemically bonded, in accordance with the invention, to the plastic barrier panel 10 about the periphery of the filter. The bonding is preferably by welding, using a thermal impulse heat seal 12. However, any suitable adhesive or some other type of heat seal welding, such as a radio frequency heat sealing weld, such as ultrasonic, may be used, depending on the contemplated time duration of storage of the waste material in a container. Also the adhesive may be in the form of a double-adhesive-sided patch interposed between the flexible plastic barrier and the confronting face of the filter marginally and peripherally of the opening.

It is preferred to use thermal impulse heat seal welding along with a polygonal shape for the filter, usually square as shown, to accommodate the rectilinear formation of the normally readily available heat-sealing implement. However, if such an implement of circular formation in proper size is available, it would be preferable to use that configuration for the filter to reduce the number of sealing operations to a minimum. Adhesive bonding is easier to use in some applications than is heat seal welding, but since many adhesives have a relatively short useful life, usually this method is used instead of welding only when long-time storage of the sealed container is not contemplated. Both the panel 10 of plastic material and the filter 11 may be of any size, small or large compared to the size of the barrier, and suitable for the particular application, whether the barrier is in the form of a plastic bag or some other sheet plastic part of containment structure.

In this embodiment of FIGS. 1 and 2, the HEPA type filter 11 is of single filter construction as made up of a pair of filtering sheets 11a marginally and peripherally bonded together and to panel 10 by heat seal 12 so as to enclose between such filtering sheets 11a a space filled with flexible filter fibers 11b. The filtering sheets 11a of the filter 11 may be heat sealed together before being heat sealed to panel 10 or at the time of heat sealing to panel 10.

The sheet plastic panel 10 has an outflow opening 13 for the discharge of air or other gas to atmosphere or otherwise from the interior of the plastic bag or of other barrier containment structure of which flexible barrier panel 10 is a part. Although not required, it is sometimes preferred that a backing panel 14 of the sheet plastic barrier material covering the reverse side of the filter 11 (opposite the side bonded to the barrier material) be bonded marginally and peripherally to panel 10 by a heat seal weld 15, or otherwise, as added protection for such filter. Backing panel 14 will, of course, require flow openings therethrough, as at 16, for the outflow of air or other gas to discharge from the containment area C (to the right of FIG. 2) passing through filter 11. For additional sealing, a ring of welding or of suitable adhesive 17 may be interposed between the inside face of the barrier material 10 marginal to and peripherally of opening 13. If backing panel 14 is provided, heat seal 12 may only bond filtering sheets 11a together, heat seal 15 serving to secure filter 11 in place relative to, rather than directly to, barrier panel 10 as an equivalent for heat sealing filter 11 directly to panel 10 by heat seal 12.

Figure 3:
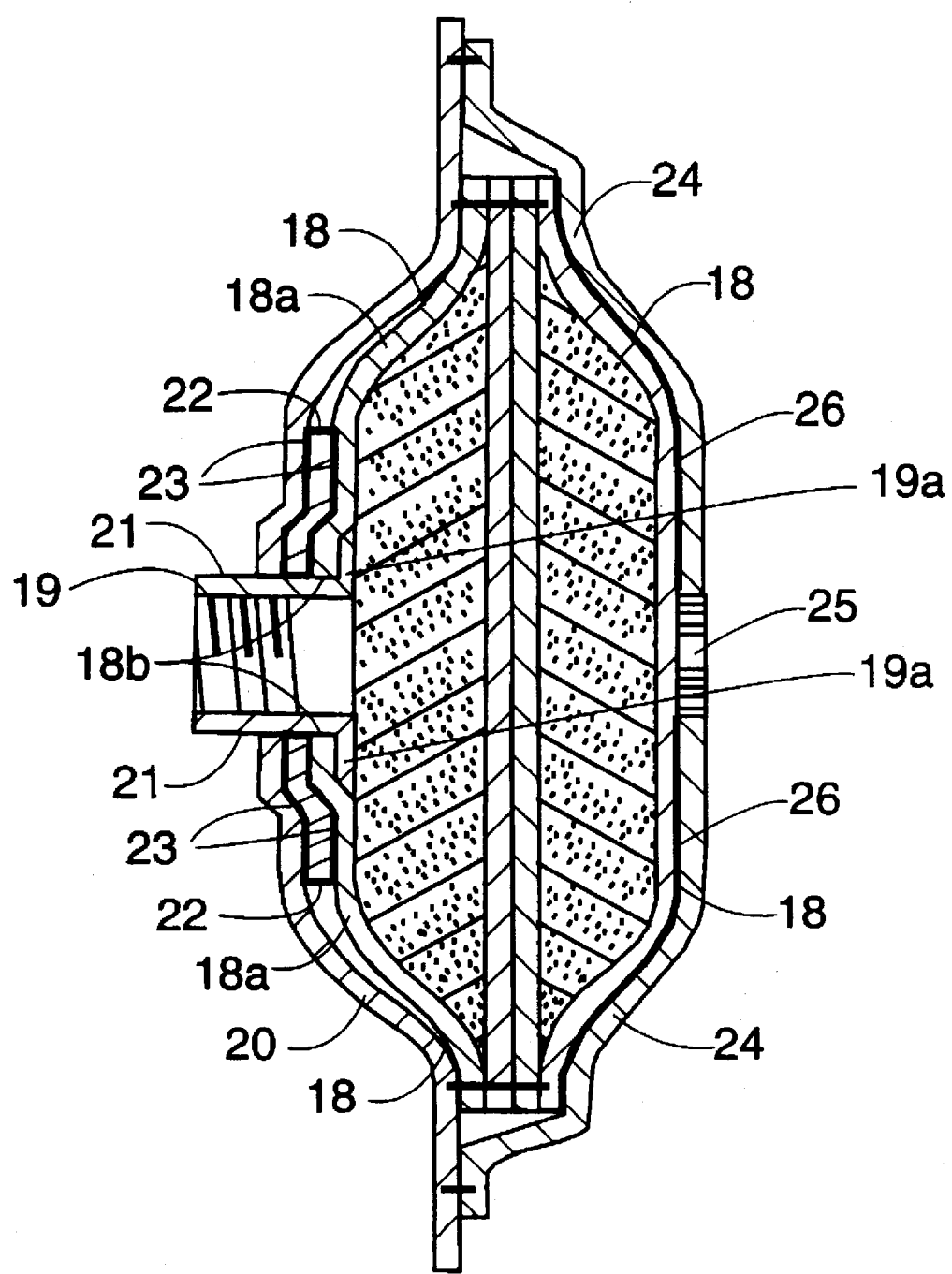
FIG. 3, a view corresponding to that of FIG. 2 but showing a somewhat different embodiment of the invention incorporating double filters arranged back-to-back, the outer side of one of that filters being provided with a coupling for controlled container venting or inflation.

It may be advantageous in various situations to utilize the embodiment of FIG. 3, wherein a pair of filters 18, respectively, (or only one, or more than two) each corresponding to the filter 11, are provided. As shown, the outside filter 18 incorporates in its outside filtering sheet 18a a coupling 19. This can serve for connecting vacuum pumping equipment to suck air or other gas out of a plastic bag 20, for example, which here provides the containment barrier, and permitting atmospheric pressure to push in the sides of the bag as the air or other gas is removed to deflate the bag. Such coupling communicates with the filters 18 through a receiving opening 21 in bag 20 and a corresponding receiving opening 18b in the confronting filter sheet 18a of the outside filter. A sealing patch 22, having both sides covered with adhesive 23 may be interposed between bag 20 and the confronting outside face of the outside filter sheet 18a of the outside filter 18 surrounding coupling 19, and a backing panel 24 may be provided to cover the otherwise exposed filter face of inside filter 18 inwardly of bag 20, leaving an inflow opening 25 for the outflow of air or other gas from bag 20 through the double filters 18 and out through coupling 19 or through opening 21 of bag 20 if no coupling is provided. A second coupling 19 can also be added in FIG. 3 to hole 25, and be retained as described for the first 19 coupling. In such event, the opening 18b need not be present. Moreover, if one or more couplings are incorporated, the flanged inner end 19a could be disposed and sealed as is sealing patch 22 and opening 18b could be eliminated. In either instance, it may be desirable to bond backing panel 24 to the confronting face of the inside filter 18, either coextensively by a suitable adhesive 26, as illustrated, heat sealing or by merely a ring of adhesive applied marginally and peripherally of opening 25, the flange 19a of the flanged end lying between the bag 20 and the corresponding filtering sheet 18a or between filtering sheet 18a and the mass of the filter fibers of the filter 18.

A coupling 19 may also serve to connect bag-inflating equipment if the circumstances call for this, and, following deflation or inflation of the bag, a plug (not shown) may be inserted in the coupling for sealing the waste-containing bag, or the outlet opening 18b may remain open if the waste material is gas generating.

In either of the embodiments, the container for waste materials is either a plastic bag as indicated for FIG. 3 or only partially made up of flexible plastic barrier material. Testing of a FIG. 1 prototype in which the containment barrier is a typical plastic bag has shown that air is removed from the bag about ten times faster than when the usual rigidly encased filter is incorporated in the bag where the cross sectional areas of the filters are the same.

The use of the container of the invention to hold hazardous waste material constitutes one aspect of the method of the invention. Another aspect is the type of filter employed and the manner of incorporating it in a flexible sheet barrier portion of a containment area.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A contamination control barrier for hazardous waste materials that include dangerous particulate matter suspended in a carrier gas, comprising a barrier material having an opening therethrough for the passage of said carrier gas; covering said opening is a flexible HEPA type filter means including a flexible filter sealably bonded to said barrier material such that said flexible HEPA type filter means becomes an integral part of such barrier material, and such that contamination control barrier prevents passage of said dangerous particulate matter through said control barrier while allowing rapid passage of said carrier gas through said control barrier.

2. A contamination control barrier according to claim 1, wherein the HEPA type filter means comprises a pair of filtering sheets confining therebetween a mass of filter fibers.

3. A contamination control barrier according to claim 1, wherein the barrier material constitutes part of a plastic bag for containing the waste material and wherein the bond between said filter means and said barrier material is at least one member selected from the group consisting of heat sealed bond and adhesive bond so as to maintain flexibility.

4. A contamination control barrier according to claim 1, wherein said barrier material comprises a flexible plastic barrier and a double-adhesive-sided patch is interposed between the flexible plastic barrier and the confronting face of the flexible filter means marginally and peripherally of the opening.

5. A contamination control barrier according to claim 1, wherein a coupling for external deflating or inflating equipment is installed in the opening.

6. A contamination control barrier according to claim 5, wherein the coupling has a flanged inner end peripherally and marginally of the opening, the flange of said flanged end lying between the corresponding filtering sheet and the mass of filter fibers of the filter.

7. A contamination control barrier according to claim 1, wherein the filter is bonded to the barrier material on one side, and further including a backing panel of flexible plastic sheet material covering a reverse side of the filter, opposite said one side and having an opening or openings for the flow of air or other gas into or out of said filter; and flexible bonding means sealing said backing panel around said filter.

8. A contamination control barrier according to claim 7, wherein the bonding means sealing the backing panel around the filter attaches said backing panel directly to the barrier material.

9. A contamination control barrier according to claim 1, including one or more additional filters of HEPA type, the several filters being arranged back-to-back.

10. A contamination control barrier according to claim 9, wherein the several filters are sealed together marginally and peripherally thereof by bonding means sealably attaching said filter to said barrier material such that said filter becomes an integral part of said barrier material.

11. A contamination control barrier according to claim 1, wherein the bonding means is a heat sealing weld.

12. A contamination control barrier according to claim 1, wherein the bonding means is a thermal impulse heat sealing weld.

13. A contamination control barrier for hazardous waste materials that include dangerous particulate matter suspended in a carrier gas, comprising a sheet of flexible impermeable barrier material having an opening therethrough for the passage of said carrier gas; covering said opening is a HEPA type filter flexibly and sealably attached to said barrier material, said filter preventing passage of said dangerous particulate matter while remaining flexible and allowing passage of said carrier gas through said control barrier; and chemical bonding means attaching said filter to said barrier material peripherally of said opening, so that said filter becomes, in effect, an integral part of said control barrier.

14. A contamination control barrier according to claim 13 wherein said filter comprises a pair of flexible filtering sheets confining therebetween a mass of filter fibers and said barrier material is a flexible plastic panel barrier material.

15. A contamination control barrier according to claim 13 wherein the barrier material constitutes part of a plastic bag for containing the waste material.

16. A contamination control barrier according to claim 13 including wherein said filter comprises one or more HEPA filters.

17. A contamination control barrier according to claim 13 wherein the chemical bonding means is a heat sealing weld.

18. A contamination control barrier according to claim 13 wherein the chemical bonding means is a thermal impulse or radio frequency heat sealing weld.

19. A contamination control barrier according to claim 13 wherein the chemical bonding means is an adhesive.

20. A contamination control barrier for hazardous waste materials that include dangerous particulate matter suspended in a carrier gas, comprising:
   a barrier material having an opening therethrough for the passage of said carrier gas;
   a HEPA type filter including a filter sealably bonded to said barrier material so as to cover the opening and such that the filter becomes an integral part of such barrier material and such that contamination control barrier prevents passage of said dangerous particulate matter through said control barrier while allowing rapid passage of said carrier gas through said control barrier; and
   a coupling for receiving external deflating or inflating equipment, the coupling being disposed in the opening and including a flanged inner end peripherally and marginally of the opening, the flange of said flanged end lying between the corresponding filtering sheet and the mass of filter fibers of the filter.

21. A contamination control barrier according to claim 20, wherein the HEPA type filter comprises a pair of filtering sheets confining therebetween a mass of filter fibers.

22. A contamination control barrier according to claim 20, wherein the barrier material constitutes part of a plastic bag for containing the waste material and wherein the bond between said filter and said barrier material is at least one member selected from the group consisting of heat sealed bond and adhesive bond.

23. A contamination control barrier according to claim 20, wherein said barrier material comprises a flexible plastic material and a double-adhesive-sided patch is interposed between the flexible plastic barrier and the confronting face of the filter marginally and peripherally of the opening.

24. A contamination control barrier according to claim 20, wherein the filter is bonded to the barrier material on one side, and further including a flexible backing panel of flexible plastic sheet material covering a reverse side of the filter, opposite said one side; having an opening or openings for the flow of air or other gas into or out of said filter; and flexible bonding means sealing said backing panel around said filter.

25. A contamination control barrier according to claim 24, wherein the bonding means sealing the flexible backing panel around the filter attaches said backing panel directly to the barrier material.

26. A contamination control barrier according to claim 20, wherein said filter comprises a plurality of HEPA type filters arranged back to back.

27. A contamination control barrier according to claim 26, wherein the several filters are sealed together marginally and peripherally thereof by bonding means sealably attaching said filter to said barrier material such that said filter becomes an integral part of said barrier material.

* * * * *